United States Patent
Luo

(10) Patent No.: US 10,686,919 B2
(45) Date of Patent: Jun. 16, 2020

(54) SLIDE RAIL AND MOBILE TERMINAL

(71) Applicant: Beijing Xiaomi Mobile Software Co., Ltd., Beijing (CN)

(72) Inventor: Tianbiao Luo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/502,194

(22) Filed: Jul. 3, 2019

(65) Prior Publication Data
US 2020/0036822 A1 Jan. 30, 2020

(30) Foreign Application Priority Data
Jul. 27, 2018 (CN) .......................... 2018 1 0843442

(51) Int. Cl.
*H04M 1/00* (2006.01)
*H04M 1/02* (2006.01)

(52) U.S. Cl.
CPC ....... *H04M 1/0237* (2013.01); *H04M 1/0266* (2013.01); *H04M 2201/08* (2013.01)

(58) Field of Classification Search
CPC .... H04M 1/04; H04M 1/0235; H04M 1/0237; H04M 1/026
See application file for complete search history.

(56) References Cited

U.S. PATENT DOCUMENTS

| 9,223,350 | B2 * | 12/2015 | Tani | G06F 1/1624 |
| 9,445,513 | B2 * | 9/2016 | Nagashima | H05K 5/02 |
| 2014/0077910 | A1 * | 3/2014 | Chaizy | H01F 7/0242 335/295 |
| 2014/0104782 | A1 * | 4/2014 | Lin | H05K 7/02 361/679.44 |

(Continued)

FOREIGN PATENT DOCUMENTS

| CN | 201230427 Y | 4/2009 |
| EP | 1 639 720 A1 | 3/2006 |

(Continued)

OTHER PUBLICATIONS

International Search Report and Written Opinion issued by the State Intellectual Property Office (SIPO) of the People's Republic of China dated Apr. 30, 2019, in PCT International Application No. PCT/CN2018/109009.

(Continued)

*Primary Examiner* — Khalid W Shaheed
(74) *Attorney, Agent, or Firm* — Finnegan, Henderson, Farabow, Garrett & Dunner, L.L.P.

(57) ABSTRACT

A slide rail, includes: a first sliding portion provided with a first magnetic part, the first magnetic part having an N pole and an S pole arranged alternately in a length direction of the slide rail; and a second sliding portion provided with a second magnetic part, the second magnetic part having an N pole and an S pole arranged alternately in the length direction, and the first sliding portion being slidably mounted to (Continued)

the second sliding portion in the length direction. During a relative sliding between the first sliding portion and the second sliding portion, the first magnetic part and the second magnetic part are opposite to each other, and are configured to switch between a state of attracting each other and a state of repelling each other.

20 Claims, 4 Drawing Sheets

(56) References Cited

U.S. PATENT DOCUMENTS

| 2016/0299286 | A1* | 10/2016 | Choi | G02B 6/0091 |
| 2017/0205855 | A1* | 7/2017 | Szeto | G06F 1/1656 |
| 2018/0335800 | A1* | 11/2018 | Kim | G06F 1/1618 |

FOREIGN PATENT DOCUMENTS

| EP | 1 926 289 | A2 | 11/2007 |
| JP | 2008113067 | A | 5/2008 |
| KR | 100833945 | B1 | 5/2008 |

OTHER PUBLICATIONS

Extended European Search Report dated Oct. 11, 2019, in counterpart European Patent Application No. 19187643.2-1216.

* cited by examiner

SLIDE RAIL AND MOBILE TERMINAL

CROSS-REFERENCE TO RELATED APPLICATIONS

This application is based on and claims priority to Chinese Patent Application Serial No. 201810843442.0, filed on Jul. 27, 2018, the entire content of which is incorporated herein by reference.

TECHNICAL FIELD

The present disclosure relates to mobile terminal technologies and, more particular, to a slide rail and a mobile terminal including the same.

BACKGROUND

With the popularization of a full screen for a mobile phone, the competition among various manufacturers in the field of full screen mobile phone is becoming increasingly fierce, and the manufactures all pursue a design of mobile phone products having a high screen to body ratio. However, to achieve a full screen so that a front surface of the mobile phone is full of screen, a bottleneck is that the front camera may not be hidden. Some elements such as the front camera can be accommodated in a region corresponding to a size of the screen by applying a slide cover to the mobile phone, and the slide cover is slid out when the front camera needs to be used. The slide cover is connected to a main body via a slide rail.

The slide rail in the related art includes an upper sliding plate, a lower sliding plate and a spring. The upper sliding plate and the lower sliding plate can be slidably mounted, one end of the spring is mounted to the upper sliding plate, and the other end of the spring is mounted to the lower sliding plate. The traditional slide rail may have following defects:

(1) A thickness of the spring used in the slide rail is 0.6 mm or larger than 0.6 mm, and a thickness of the slide rail is about 1.6 mm; the thickness of the whole slide rail cannot be reduced due to a space occupied by the spring itself, so a thinner slide rail cannot be made, thus resulting in that a thickness of a mobile terminal such as the mobile phone cannot be reduced;

(2) In order to decrease the thickness of the slide rail, the lower sliding plate of the slide rail is hollowed to accommodate the spring, which causes a strength of the slide rail to be lowered;

(3) The spring has a weak fatigue resistance; in the life cycle of the slide rail, with the service time increasing, the elastic property of the spring changes, thus influencing the use hand-feeling of the user;

(4) As the elastic force of the spring in the height direction of the slide rail changes during the sliding of the slide rail, a gap between the upper sliding plate and the lower sliding plate of the slide rail is not uniform; and (5) When the slide rail slides to a certain position (a dead point), a direction of the elastic force of the spring will switch, and thus the slide rail stops.

SUMMARY

In order to overcome the problems existing in the related art, the present disclosure provides a slide rail, which can reduce a thickness of the slide rail while ensuring a structural strength.

According to embodiments of a first aspect of the present disclosure, a slide rail is provided. The slide rail includes: a first sliding portion provided with a first magnetic part, the first magnetic part having an N pole and an S pole arranged alternately in a length direction of the slide rail; and a second sliding portion provided with a second magnetic part, the second magnetic part having an N pole and an S pole arranged alternately in the length direction, and the first sliding portion being slidably mounted to the second sliding portion in the length direction. During a relative sliding between the first sliding portion and the second sliding portion, the first magnetic part and the second magnetic part are opposite to each other, and are configured to switch between a state of attracting each other and a state of repelling each other.

According to embodiments of a second aspect of the present disclosure, a mobile terminal is provided. The mobile terminal includes a slide rail. The slide rail includes: a first sliding portion provided with a first magnetic part, the first magnetic part having an N pole and an S pole arranged alternately in a length direction of the slide rail and a second sliding portion provided with a second magnetic part, the second magnetic part having an N pole and an S pole arranged alternately in the length direction, and the first sliding portion being slidably mounted to the second sliding portion in the length direction. During a relative sliding between the first sliding portion and the second sliding portion, the first magnetic part and the second magnetic part are opposite to each other, and are configured to switch between a state of attracting each other and a state of repelling each other.

It is to be understood that the above general description and the following detailed description are merely exemplary and explanatory and do not limit the present disclosure.

BRIEF DESCRIPTION OF THE DRAWINGS

The drawings herein, which are incorporated into the specification and form a part of the specification, illustrate the embodiments consistent with the disclosure and are used for explaining the principles of the present disclosure together with the specification.

DETAILED DESCRIPTION

Figure 1:
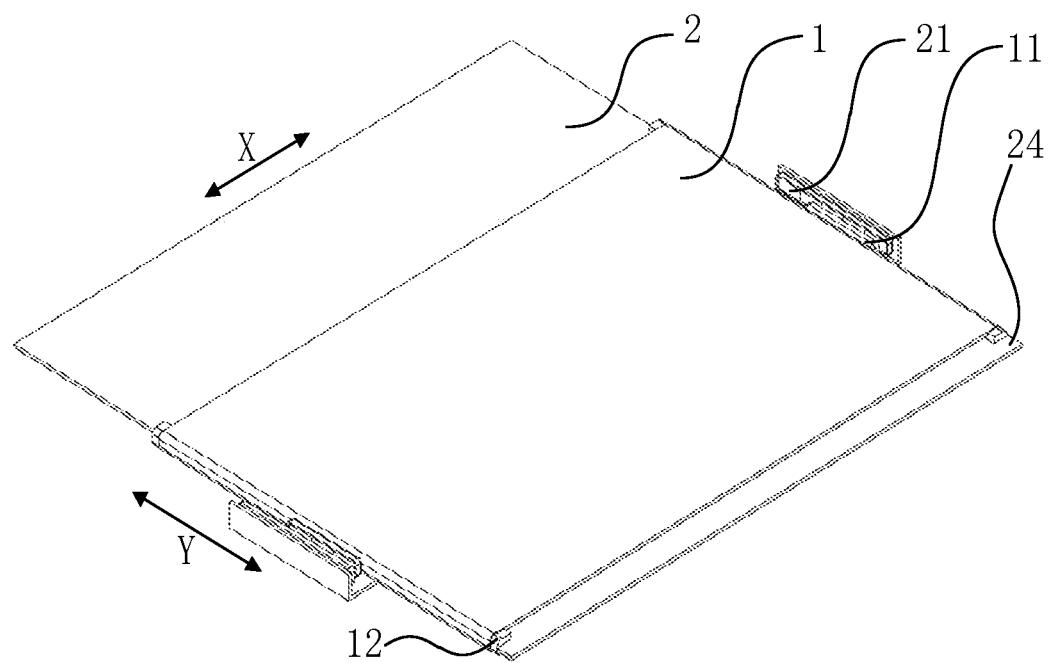
FIG. 1 is a schematic view of a slide rail according to an embodiment.

Exemplary embodiments are described in detail herein and illustrated in the accompanying drawings. When the following description refers to the accompanying drawings, the same numbers in the different figures represent the same or similar elements unless otherwise indicated. The embodiments described do not represent all embodiments consistent with the present disclosure, instead, they are merely examples of devices and methods consistent with aspects of the present disclosure as described in the appended claims.

Unless otherwise specified, a width direction X refers to a width direction of a slide rail, a length direction Y refers to a length direction of the slide rail, i.e., a sliding direction of the slide rail, and a height direction Z refers to a height direction of the slide rail, i.e., a thickness direction of the slide rail. N pole and S pole in the drawings and the following embodiments are for convenience of indicating that the same polarity is mutually repulsive, the different polarities attract each other, and shall not limit the present disclosure. The positions of the N pole and the S pole can be exchanged.

As illustrated in FIG. 1 to FIG. 5, a slide rail includes a first sliding portion 1 and a second sliding portion 2, and the first sliding portion 1 and the second sliding portion 2 can have a shape of a rectangular flat plate. The first sliding portion 1 is provided with a sliding slot 12 extending along the length direction Y and the sliding slot 12 is, for example, a C-shaped slot, i.e., a section of the sliding slot 12 has a C shape. The second sliding portion 2 is mounted in the sliding slot 12 and slidable along the sliding slot 12, so that the first sliding portion 1 and the second sliding portion 2 can slide relative to each other along the length direction Y, and the first sliding portion 1 is located above the second sliding portion 2. The second sliding portion 2 may be provided with the sliding slot extending along the length direction in order to allow the first sliding portion 1 and the second sliding portion 2 to be slidably connected.

Figure 5:
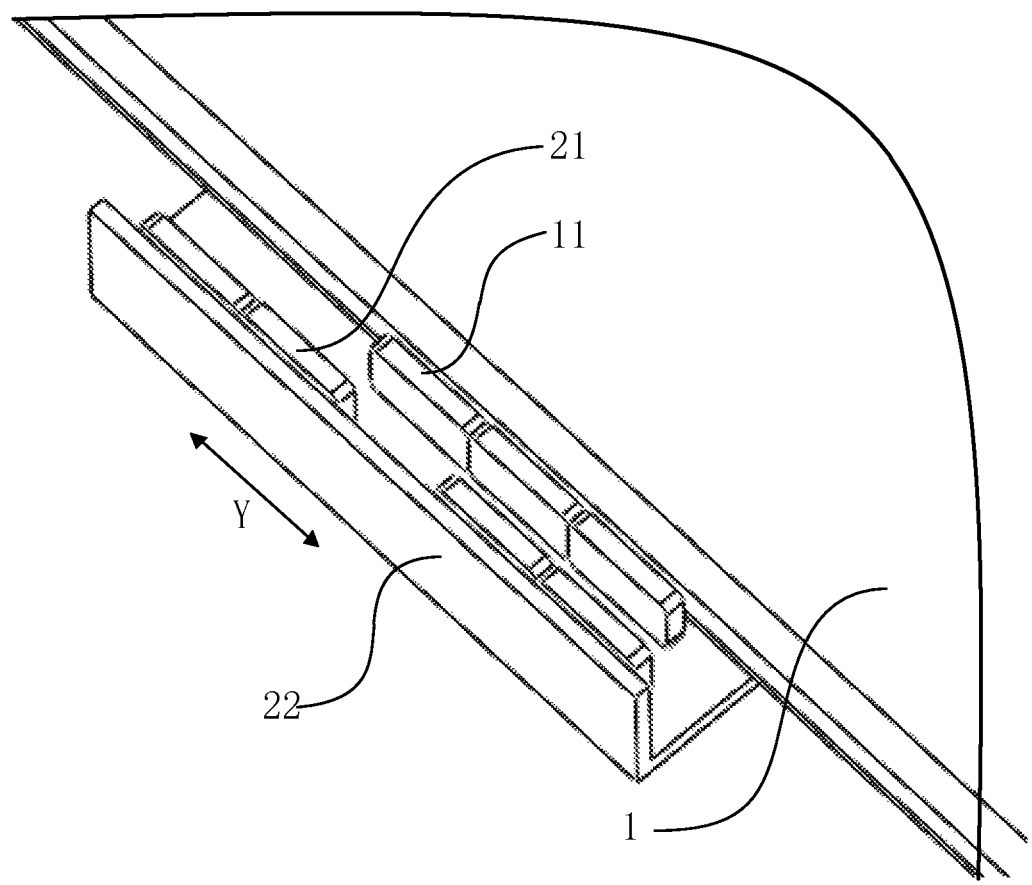
FIG. 5 is a partially enlarged view of a slide rail (excluding a first housing and a second housing) according to an embodiment.

The second sliding portion 2 is provided with a first position limiting part 24 and a second position limiting part (not shown), the first position limiting part 24 and the second position limiting part can block the first sliding portion 1, so that the first sliding portion 1 can slide between the first position limiting part 24 and the second position limiting part along the length direction Y When the first sliding portion 1 slides to the first position limiting part 24 and stops, the first sliding portion I is located in a first position (as illustrated in FIG. 1 and FIG. 5), and when the first sliding portion 1 slides to the second position limiting part and stops, the first sliding portion 1 is located in a second position.

It will be understood that the slide rail may not be provided with the first position limiting part 24 and the second position limiting part, but the first position limiting part and the second position limiting part may be provided to a structural member such as a housing to which the slide rail is mounted, thereby playing the role of limiting a sliding distance of the first sliding portion 1.

The first sliding portion 1 is provided with a first magnetic part 11, and the first magnetic part 11 can be disposed at each of two opposite sides of the first sliding portion 1 in the width direction X. The second sliding portion 2 is provided with a second magnetic part 21, and the second magnetic part 21 can be disposed at each of two opposite sides of the second sliding portion 2 in the width direction X. The first magnetic part 11 and the second magnetic part 21 are located at each of two opposite sides in the width direction X, such that a space in a central portion of the slide rail will not be occupied, thus allowing a thickness of the central portion of the slide rail to be reduced as much as possible. For example, the second magnetic part 21 can be located at an outer side of the first magnetic part 11 in the width direction X, i.e., at each side of the first sliding portion 1, the first magnetic part 11 is sandwiched between the first sliding portion 1 and the second magnetic part 21. That is, the first sliding portion 1 is located between the second magnetic parts 21 at two sides of the second sliding portion 2, and the first magnetic part 11 and the second magnetic part 21 are opposite to each other.

A side surface of the first magnetic part 11 in the width direction X and a side surface of the second magnetic part 21 also in the width direction X are opposite to each other, that is, the side surface of the first magnetic part 11 and the side surface of the second magnetic part 21, which are opposite to each other, are perpendicular to the width direction X. A distance between the first magnetic part 11 and the second magnetic part 21 at a side of the slide rail is equal to a distance between the first magnetic part 11 and the second magnetic part 21 at another side of the slide rail, so that an attractive force or a repulsive force between the first magnetic part 11 and the second magnetic part 21 at a side of the slide rail is equal to and opposite in direction to another attractive force or another repulsive force between the first magnetic part 11 and the second magnetic part 21 at another side of the slide rail, and thus the attractive forces or the repulsive forces can cancel out each other, such that the magnetic force will not generate an effect on the first sliding portion 1 along the width direction X.

Figure 2:
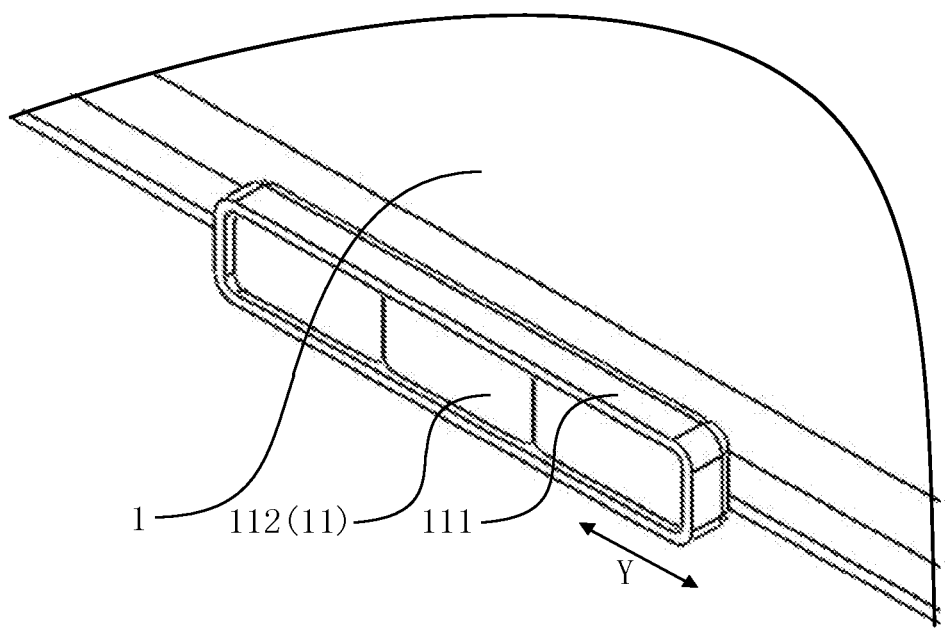
FIG. 2 is a partially enlarged view of a first sliding portion of a slide rail according to an embodiment.
Figure 3:
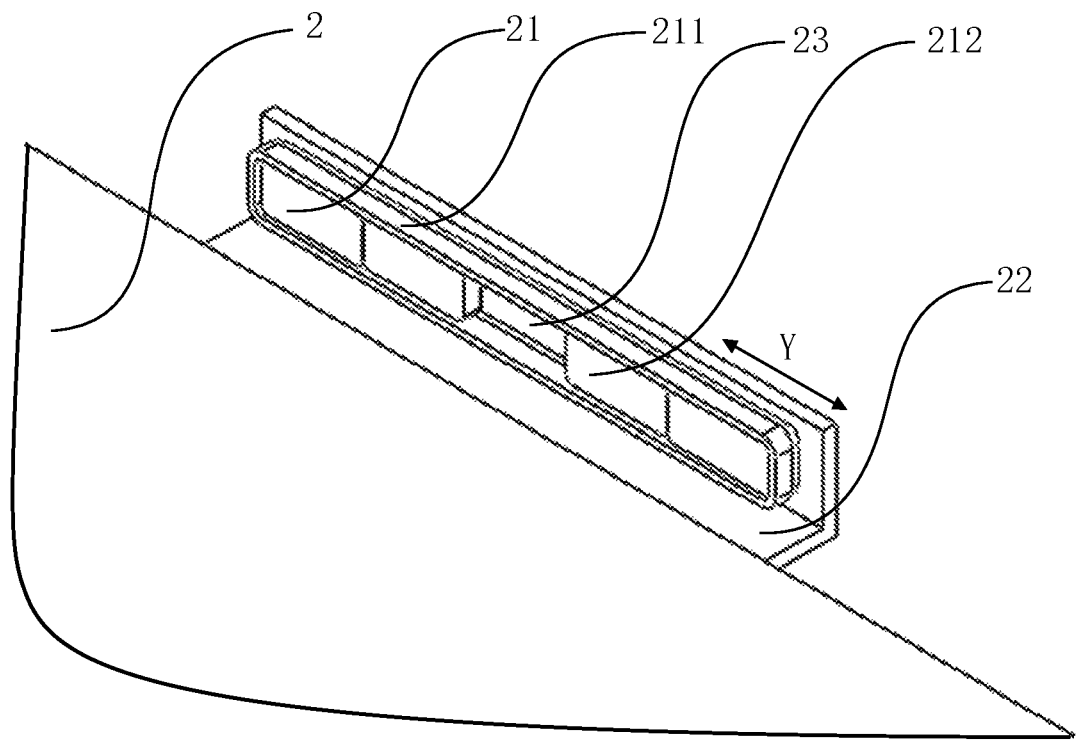
FIG. 3 is a partially enlarged view of a second sliding portion of a slide rail according to an embodiment.
Figure 4:
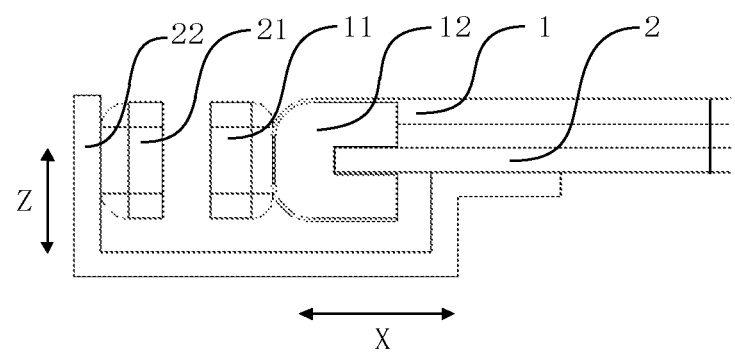
FIG. 4 is a side view of the slide rail in FIG. 1.

As illustrated in FIG. 2 to FIG. 4, in the embodiment, the first magnetic part 11 is mounted to the first sliding portion 1 through a first housing 111. For example, the first magnetic part 11 is mounted in the first housing 111, and the first housing 111 is mounted at each side of the first sliding portion 1 in the width direction X. The second magnetic part 21 is mounted to the second sliding portion 2 through a second housing 211. For example, the second magnetic part 21 is mounted in the second housing 211, d the second housing 211 is mounted at each side of the second sliding portion 2 in the width direction X through a connecting bracket 22.

As illustrated in FIGS. 2, 5, and 6a to 6c, in the length direction Y, the N pole and the S pole of the first magnetic part 11 are arranged alternately. For example, the first magnetic part 11 has a plurality of magnets 112 such as three magnets arranged along the length direction Y, and the plurality of the magnets 112 can be connected with each other through such as bonding. The plurality of magnets 112 attract each other so that the N poles and the S poles are arranged alternately. The N pole and the S pole of each magnet 112 are arranged along the width direction X. It will be understood that the N pole and the S pole of each magnet 112 can be arranged along the length direction Y or the height direction Z, as long as the N poles and the S poles of the plurality of magnets 112 are arranged alternately.

In the embodiment, a length of each magnet 112 is L, and a length of the first magnetic part 11 is 3 L.

As illustrated in FIGS. 3, 5, and 6a to 6c, in the length direction Y, the N pole and the S pole of the second magnetic part 21 are arranged alternately, a size of the second magnetic part 21 in the length direction Y is greater than a size of the first magnetic part 11 in the length direction Y, so that during the sliding of the first sliding portion 1, the first magnetic part 11 can correspond to different sections of the second magnetic part 21. In the embodiment, a length of the second magnetic part 21 is 5 L.

For example, the second magnetic part 21 has a plurality of magnets 212 arranged along the length direction Y and the plurality of the magnets 212 can be connected with each other through such as bonding. The N pole and the S pole of each magnet 212 are arranged along the width direction X. It will be understood that the N pole and the S pole of each magnet 212 can he arranged along the length direction Y or the height direction Z, as long as the N poles and the S poles of the plurality of magnets 212 are arranged alternately.

Further, the plurality of magnets 212 of the second magnetic part 21 can be arranged discontinuously. For example, the second magnetic part 21 may be provided with a vacant position 23, and the second magnetic part 21 is not provided with the magnet 212 in the vacant position 23.

For example, the second magnetic part 21 includes four magnets 212, a central section of the second magnetic part 21 is provided the vacant position 23, two magnets 212 are provided at one side of the vacant position 23, and the other two magnets 212 are disposed at the other side of the vacant position 23. The polarities of the respective magnets 212 at two sides of the vacant position 23 are symmetrical. A length of the vacant position 23 is same with a length of one magnet 212, and the length of each magnet 212 is L.

By providing the second magnetic part 21 with the vacant position 23, when the first magnetic part 11 slides to a position corresponding to the vacant position 23, the magnetic force acted on the first magnetic part 11 is reduced, thereby making a relative sliding process between the first sliding portion 1 and the second sliding portion 2 more smoother. It will be understood that a non-magnetic material may be provided in the vacant position 23 to connect the four magnets 212 together.

The first magnetic part 11 and the second magnetic part 21 have the same height, that is, there is no height difference between the first magnetic part 11 and the second magnetic part 21 in the height direction Z, so that there is no magnetic force between the first magnetic part 11 and the second magnetic part 21 in the height direction Z, and thereby it may ensure a uniform gap between the first sliding portion 1 and the second sliding portion 2 in the height direction Z.

The magnet 112 of the first magnetic part 11 and/or the magnet 212 of the second magnetic part 21 may be a permanent magnet or an electromagnet. The electromagnet can change a direction and an intensity of magnetic fields of the magnets 112 and 212 by changing an energization direction and a current intensity, so that automatic sliding of the slide rail is realized, and also, the direction and speed of the sliding can be adjusted.

A supporting portion (not shown) may be provided between the first sliding portion 1 and the second sliding portion 2, the supporting portion is used for supporting the first sliding portion 1, and the supporting portion may have, for example, a strip shape or a dot shape. The supporting portion may be made of a wear-resistant material such as polyformaldehyde (POM). By supporting the first sliding portion 1 by means of the supporting portion, a contact of a large area between the first sliding portion 1 and the second sliding portion 2 can be prevented, so that the friction between the first sliding portion 1 and the second sliding portion 2 is reduced. It will be understood that the supporting position may be connected to the first sliding portion 1, and also may be connected to the second sliding portion 2. Further, a surface of the supporting portion is coated with lubricant, which can further reduce the friction between the first sliding portion 1 and the second sliding portion 2.

Figure 6A:
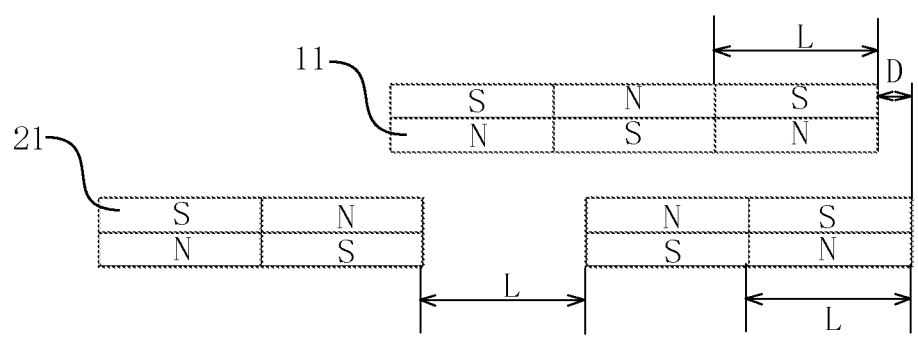
FIGS. 6*a*-6*c* are schematic diagrams of a sliding process of a slide rail according to an embodiment.
Figure 6B:
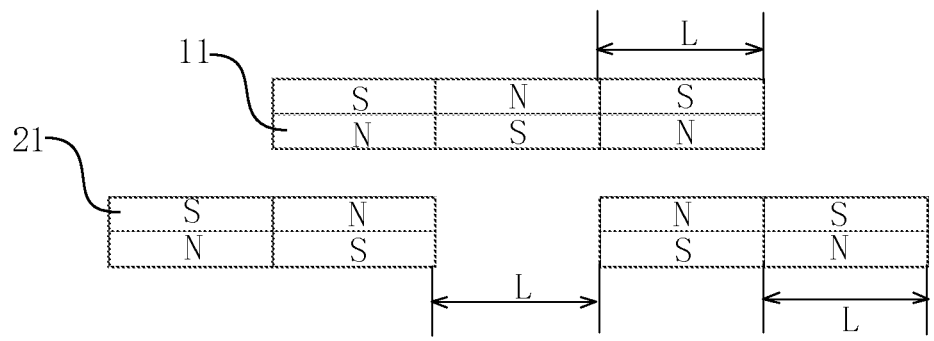
Figure 6C:
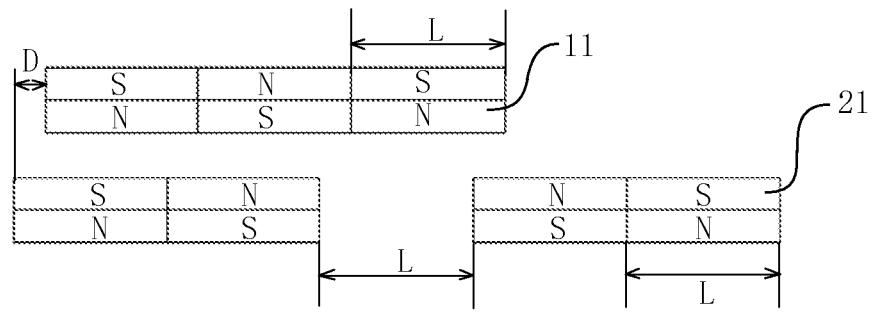

As illustrated in FIGS. 6a to 6c, a sliding process of the first sliding portion 1 from the first position to the second position will be described below.

As illustrated in FIG. 6a, when the first sliding portion 1 is in the first position, under the action of the first position limiting part 24, the N pole of the first magnetic part 11 and the S pole of the second magnetic part 21 are opposite, and the S pole of the first magnetic part 11 is opposite to the N pole of the second magnetic part 21. In an embodiment, the N pole of the first magnetic part 11 and the S pole of the second magnetic part 21 are partially opposite to each other, and the S pole of the first magnetic part 11 and the N of the second magnetic part 21 are also partially opposite to each other. A part of the N pole of the first magnetic part 11 opposite to the S pole of the second magnetic part 21 is larger than another part of the N pole of the first magnetic part 11 opposite to the N pole of the second magnetic part 21, and a part of the S pole of the first magnetic part 11 opposite to the N pole of the second magnetic part 21 is larger than another part of the S pole of the first magnetic part 11 opposite to the S pole of the second magnetic part 21. That is, the first magnetic part 11 and the second magnetic part 21 attract each other. It will be understood that, compared to being completely opposite to each other, the attraction force between the first magnetic part 11 and the second magnetic part 21 is less than that in the case of being partially opposite to each other, and thus, when an external force needs to be applied to push the slide rail to slide, the required force can be smaller.

For example, when the first sliding portion 1 is in the first position, a length of opposite parts having a same polarity of one magnet 112 of the first magnetic part 11 and one magnet 212 of the second magnetic part 21 is D, and a length of opposite parts having different polarities of the one magnet 112 of the first magnetic part 11 and another one magnet 212 of the second magnetic part 21 is L-D, in which each magnet 112 has a length of L and each magnet 212 also has a length of L. That is, the first magnetic part 11 and the second magnetic part 21 are staggered in the length direction Y by a distance of D. It will be understood that in order to allow the first magnetic part 11 and the second magnetic part 21 to attract each other, D is less than L/2.

By the mutual attraction of the first magnetic part 11 and the second magnetic part 21, the first sliding portion 1 can be kept in the first position without being subjected to an external force and will not slide relative to the second sliding portion 2.

When the first sliding portion 1 is pushed leftwards under the action of the external force, the first sliding portion 1 overcomes the attraction force between the first magnetic part 11 and the second magnetic part 21 and slides leftwards.

As illustrated in FIG. 6b, when the first sliding portion 1 slides by a distance of L-D, the first sliding portion 1 is located in a third position. The N pole of the first magnetic part 11 is opposite to the N pole of the second magnetic part 21, and the first magnetic part 11 and the second magnetic part 21 repel each other, so that it is difficult for the first sliding portion 1 to be kept stable. The first sliding portion 1 continues sliding leftwards under inertia, and in this case, the repulsive force between the first magnetic part 11 and the second magnetic part 21 can push the first magnetic part 11 to continue sliding leftwards. That is, after the first sliding portion 1 slides by the distance of L-D under the action of the external force, the first sliding portion 1 can continue sliding under the action of the magnetic force, even if the external force is no longer applied.

As illustrated in FIG. 6c, the first sliding portion 1 continues sliding to the second position, and is blocked by the second position limiting part to stop. The N pole of the first magnetic part 11 is opposite to the S pole of the second magnetic part 21, and the S pole of the first magnetic part 11 is opposite to the N pole of the second magnetic part 21. In an embodiment, the N pole of the first magnetic part 11 and the S pole of the second magnetic part 21 are partially opposite, and the S pole of the first magnetic part 11 and the N of the second magnetic part 21 are partially opposite. A part of the N pole of the first magnetic part 11 opposite to the S pole of the second magnetic part 21 is larger than another part of the N pole of the first magnetic part 11 opposite to the N pole of the second magnetic part 21, and a part of the S pole of the first magnetic part 11 opposite to the N pole of the second magnetic part 21 is larger than another part of the S pole of the first magnetic part 11 opposite to the S pole of the second magnetic part 21. That is, the first magnetic part 11 and the second magnetic part 21 attract each other. It will be understood that, compared to being completely opposite to each other, the attraction force between the first magnetic part 11 and the second magnetic part 21 is less than that in the case of being partially opposite to each other, and thus, when an external force needs to be applied to push the slide rail to slide, the required force can be smaller.

For example, when the first sliding portion 1 is in the second position, a length of opposite parts having a same polarity of one magnet 112 of the first magnetic part 11 and one magnet 212 of the second magnetic part 21 is D, and a length of opposite parts having different polarities of the one magnet 112 of the first magnetic part 11 and another one magnet 212 of the second magnetic part 21 is L-D, in which each magnet 112 has a length of L and each magnet 212 also has a length of L. It will be understood that a sliding distance of the first sliding portion I along the length direction Y of the slide rail is 2(L-D). If the N pole of the first magnetic part 11 and the S pole of the second magnetic part 21 are completely opposite, and the S pole of the first magnetic part 11 and the N pole of the second magnetic part 21 are completely opposite, i.e., D=0, when the first sliding portion is located in both the first position and the second position, the sliding distance of the first sliding portion 1 along the length direction Y of the slide rail is 2 L. If the N pole of the first magnetic part 11 and the S pole of the second magnetic part 21 are completely opposite, and the S pole of the first magnetic part 11 and the N pole of the second magnetic part 21 are completely opposite, when the first sliding portion is located in either the first position or the second position, the sliding distance of the first sliding portion 1 along the length direction Y of the slide rail is 2 L-D.

In the embodiment, when the first sliding portion 1 slides by a distance less than L-D under the action of the external force, if the first sliding portion 1 has a speed high enough to overcome the attraction force of the first magnetic part 11 and the second magnetic part 12 so as to enable the first sliding portion 1 to continue moving, the first sliding portion 1 can move by a distance of L-D, and hence further to the second position if the first sliding portion 1 does not have the speed high enough, the first sliding portion 1 can return to the first position under the action of the magnetic force between the first magnetic part 11 and the second magnetic part 21. When the first sliding portion 1 slides by a distance greater than. L-D and less than 2 (L-D) under the action of the external force, the first sliding portion 1 can move to the second position under the action of the magnetic force between the first magnetic part 11 and the second magnetic part 21.

It will be understood that the stronger the magnetic properties of the first magnetic part 11 and the second magnetic part 21, the stronger the attraction force and the repulsive force between the first magnetic part 11 and the second magnetic part 21, and the larger the force required to slide the slide rail from the first position or the second position.

The sliding process of the first sliding portion 1 from the second position to the first position is contrary to the sliding process of the first sliding portion 1 from the first position to the second position which thus will not be described in detail.

Other embodiments of the present disclosure will be readily apparent to those skilled in the art after the description is considered and the disclosure herein is practiced. The present application intends to cover any variations, uses or adaptations of the present disclosure. The variations, uses or adaptations follow the general principles of the present disclosure and include the common general knowledge or common technical means in the art, which are not disclosed in the disclosure. The descriptions and embodiments are merely exemplary, and the true scope and spirit of the present disclosure are indicated by the appended claims.

The present disclosure is not limited to the precise structures described above and shown in the drawings, and various modifications and changes can be made without departing from the scope thereof. The scope of the present disclosure is determined by the appended claims.

What is claimed is:

1. A slide rail for a mobile terminal, comprising:
    a first sliding portion provided with a first magnetic part, the first magnetic part having an N pole and an S pole arranged alternately in a length direction of the slide rail; and
    a second sliding portion provided with a second magnetic part, the second magnetic part having an N pole and an S pole arranged alternately in the length direction, wherein the second sliding portion is provided with a sliding slot extending along the length direction, and the first sliding portion is mounted in the sliding slot and slidable along the sliding slot extending along the length direction, so that the first sliding portion being slidably mounted to the second sliding portion in the length direction,
    wherein during a relative sliding between the first sliding portion and the second sliding portion along the length direction, the first sliding portion keeps parallel to the second sliding portion, the first magnetic part and the second magnetic part are opposite to each other, and are configured to switch between a state of attracting each other and a state of repelling each other.

2. The slide rail according to claim 1, wherein the first magnetic part is disposed at each of two opposite sides of the first sliding portion in a width direction of the slide rail, and the second magnetic part is disposed at each of two opposite sides of the second sliding portion in the width direction of the slide rail.

3. The slide rail according to claim 1, wherein a size of the second magnetic part in the length direction is greater than a size of the first magnetic part in the length direction.

4. The slide rail according to claim 3, wherein the first magnetic part and the second magnetic part each have a plurality of magnets arranged along the length direction.

5. The slide rail according to claim 4, wherein each magnet has an N pole and an S pole arranged along the width direction of the slide rail,
    wherein the N pole of each magnet of the first magnetic part is configured as the N pole of the first magnetic part, and the S pole of each magnet of the first magnetic part is configured as the S pole of the first magnetic part,
    wherein the N pole of each magnet of the second magnetic part is configured as the N pole of the second magnetic part, and the S pole of each magnet of the second magnetic part is configured as the S pole of the second magnetic part.

6. The slide rail according to claim 4, wherein the first sliding portion slides relative to the second sliding portion starting from a first position and ending in a second position, the N pole and the S pole of each magnet have a length of L in the length direction, and a sliding distance of the first sliding portion between the first position and the second position is less than or equal to 2 L, and greater than L.

7. The slide rail according to claim 1, wherein the first magnetic part and the second magnetic part have a same height.

8. The slide rail according to claim 6, wherein in a sliding distance range of the first sliding portion, the first sliding portion has a first position and a second position where the first magnetic part and the second magnetic part attract each other, and between the first position and the second position, the first sliding portion has a third position where the first magnetic part and the second magnetic part repel each other.

9. The slide rail according to claim 8, wherein the first sliding portion is limited in the first position through a first position limiting part, and the first sliding portion is limited in the second position through a second position limiting part;
when the first sliding portion is located in the first position and in the second position, opposite sections of the first magnetic part and the second magnetic part have opposite polarities, so that the first sliding portion and the second sliding portion attract each other.

10. The slide rail according to claim 8, wherein the first sliding portion is limited in the first position through a first position limiting part, and the first sliding portion is limited in the second position through a second position limiting part,
when the first sliding portion is located in the first position and the second position, opposite sections of the first magnetic part and the second magnetic part comprises first opposite sections having opposite polarities and second opposite sections having same polarity, and a size of the first opposite sections having opposite polarities is greater than a size of the second opposite sections having same polarity, so that the first sliding portion and the second sliding portion attract each other.

11. The slide rail according to claim 10, wherein in at least one of the first position and the second position where the first magnetic part and the second magnetic part attract each other, the first magnetic part and the second magnetic part are staggered by a distance less than L/2.

12. The slide rail according to claim 4, wherein a central section of the second magnetic part has a vacant position and no magnet is provided in the vacant position.

13. The slide rail according to claim 12, wherein a size of the vacant position in the length direction is equal to a length of one of the plurality of magnets.

14. The slide rail according to claim 1, wherein at least one of the first magnetic part and the second magnetic part comprises one of a permanent magnet or an electromagnet.

15. A mobile terminal, comprising a slide rail, wherein the slide rail comprises:
a first sliding portion provided with a first magnetic part, the first magnetic part having an N pole and an S pole arranged alternately in a length direction of the slide rail; and
a second sliding portion provided with a second magnetic part, the second magnetic part having an N pole and an S pole arranged alternately in the length direction, wherein the second sliding portion is provided with a sliding slot extending along the length direction, and the first sliding portion is mounted in the sliding slot and slidable along the sliding slot extending along the length direction, so that the first sliding portion being slidably mounted to the second sliding portion in the length direction,
wherein during a relative sliding between the first sliding portion and the second sliding portion along the length direction, the first sliding portion keeps parallel to the second sliding portion, the first magnetic part and the second magnetic part are opposite to each other, and are configured to switch between a state of attracting each other and a state of repelling each other.

16. The mobile terminal according to claim 15, wherein a size of the second magnetic part in the length direction is greater than a size of the first magnetic part in the length direction,
wherein the first magnetic part and the second magnetic part each have a plurality of magnets arranged along the length direction.

17. The mobile terminal according to claim 16, wherein the first sliding portion slides relative to the second sliding portion starting from a first position and ending in a second position, the N pole and the S pole of each magnet have a length of L in the length direction, and a sliding distance of the first sliding portion between the first position and the second position is less than or equal to 2 L, and greater than L.

18. The mobile terminal according to claim 15, wherein in a sliding distance range of the first sliding portion, the first sliding portion has a first position and a second position where the first magnetic part and the second magnetic part attract each other, and between the first position and the second position, the first sliding portion has a third position where the first magnetic part and the second magnetic part repel each other.

19. The mobile terminal according to claim 18, wherein the first sliding portion is limited in the first position through a first position limiting part, and the first sliding portion is limited in the second position through a second position limiting part;
when the first sliding portion is located in the first position and in the second position, opposite sections of the first magnetic part and the second magnetic part have opposite polarities, so that the first sliding portion and the second sliding portion attract each other.

20. The mobile terminal according to claim 18, wherein the first sliding portion is limited in the first position through a first position limiting part, and the first sliding portion is limited in the second position through a second position limiting part,
when the first sliding portion is located in the first position and the second position, opposite sections of the first magnetic part and the second magnetic part comprises first opposite sections having opposite polarities and second opposite sections having same polarity, and a size of the first opposite sections having opposite polarities is greater than a size of the second opposite sections having same polarity, so that the first sliding portion and the second sliding portion attract each other.

* * * * *